PRODUCTION OF MAGNETIC MATERIAL FOR USE IN COMPUTERS OR MAGNETIC MEMORY SYSTEMS

Filed June 22, 1955

INVENTOR
JOHN MARTIN HERBERT
ANTHONY WILLIAM SIMPSON

BY Greene, Pineles and Durr

ATTORNEY

United States Patent Office 2,825,046

Patented Feb. 25, 1958

2,825,046

PRODUCTION OF MAGNETIC MATERIAL FOR USE IN COMPUTERS OR MAGNETIC MEMORY SYSTEMS

John M. Herbert, Horton, and Anthony W. Simpson, Radcliffe-on-Trent, England, assignors to The Plessey Company Limited, Ilford, England, a British company Application June 22, 1955, Serial No. 517,223

3 Claims. (Cl. 340—174)

Figures 1, 2:
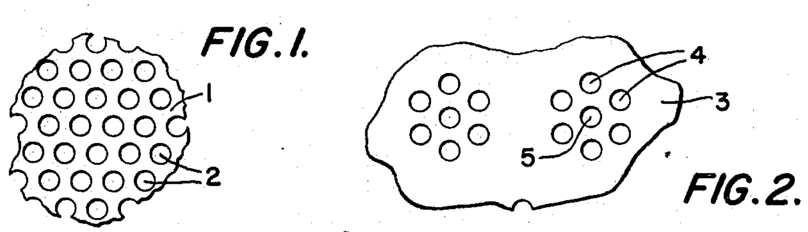

This invention relates to the production of magnetic materials for use in computers or memory systems, more particularly to ferrite materials having a hysteresis loop of substantially square or rectangular shape.

A memory matrix for computing machines has been made by threading conductors through an array of small rings of suitable magnetic material. These rings are usually less than 0.05" in internal diameter and difficulties may arise in handling, testing and threading.

An object of the present invention is to provide a memory matrix which dispenses with the use of small rings.

According to one aspect of this invention the magnetic material consists of thin sheets having a large number of small holes arranged in patterns to suit a particular wiring arrangement, the arrangement being such that each hole having a conductor threaded therethrough is isolated magnetically by adjacent holes to avoid magnetic coupling between adjacent threaded elements.

According to another aspect of the invention, the wires are applied to the thin sheets by printed circuit technique; they pass through holes in the magnetic material and are isolated magnetically as herein set forth. Said printed circuit is applied to produce a threaded conductor on alternate surfaces of the sheet.

The holes in the matrix may be disposed at a suitable distance apart; alternatively a symmetrical array of unused holes may be arranged round the threaded hole. For instance, the holes can be uniformly spaced so that each has six equidistant neighbours, and so that the space between the holes is less than the diameter of a hole.

Alternate holes in alternate rows can then be threaded and each hole will be sufficiently isolated from its threaded neighbour. The perforated sheets may be arranged to form three dimensional arrays so that the threading can be simplified and, provided the magnetic material is substantially insulating some of the conductors may be replaced by conductors printed, or applied by other known processes, on the surfaces of the sheets.

Preferably the sheets of magnetic material are about ½ to 1 mm. thick with ½ mm. diameter holes.

A further advantage of the method is that the holes can be made exceedingly small while at the same time they have a definite location in the sheet. (Testing may be facilitated because only a small proportion of the holes in any given sheet will have to be checked electrically in order to ensure that the magnetic properties of the whole sheet are suitable.)

A suitable method of fabrication is to disperse the magnetic material in the form of a fine powder, in an organic medium and to cast a liquid layer of this suspension on to a flat surface. When the volatile part of the organic medium has evaporated a flexible film containing the organic material remains and can be perforated mechanically in the desired pattern. The perforated film can then be fired to burn away the organic material and to sinter the magnetic material to form a coherent body.

Alternatively the liquid suspension can be made to solidify round a pattern of pins projecting from, or resting on, the flat surface so that the film is already perforated when it is peeled from the base.

The following example will serve to illustrate the invention.

The following materials, in the form of fine powders, were thoroughly mixed.

| | Grams |
|---|---|
| Magnesium carbonate | 281 |
| Manganese carbonate | 1149 |
| Ferric oxide | 1597 |

The mixture was formed into cakes by the addition of water in a dough mixer and was then fired in an oxidizing atmosphere at 1100° C. for two hours. The resulting mass was ground until it all passed through a 200 mesh screen.

2000 g. of this powder was mixed with 640 g. of a lacquer containing 10 parts diamyl tartarate and 18 parts cellulose acetobutyrate in 100 parts of ethylene dichloride. The resulting liquid, of creamy consistency, was spread on glass plates to give a layer 0.02 to 0.04" thick. After the solvent had evaporated the loaded film was easily peeled from the plates. It was perforated by piercing in the desired pattern with a thin steel rod.

The perforated film, if desired with a silk screened pattern of conductors, was then fired at 1400° C. on an alumina batt in air.

The accompanying drawing will serve to illustrate the invention.

Fig. 1 is a detail of a magnetic sheet 1 perforated with a large number of holes 2, arranged in pattern. The holes are considerably magnified for clarity.

Fig. 2 shows a detail of a sheet 3 having a symmetrical array of unused holes 4 around a hole 5 adapted to be threaded.

Figure 3:
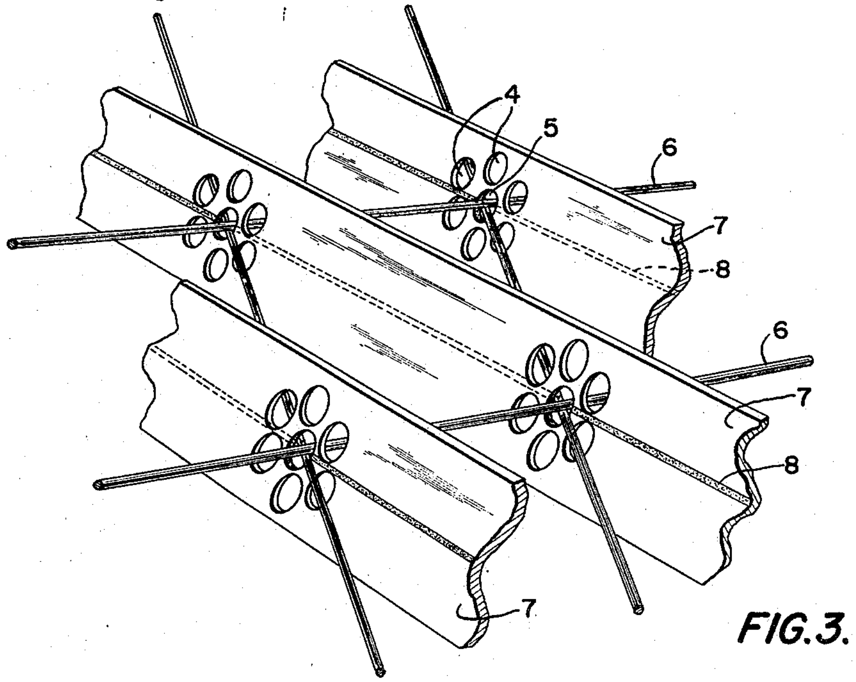

Fig. 3 is a diagrammatic illustration showing the wires 6 threaded through magnetic sheets 7 having holes arranged as herein set forth with reference to Fig. 2. The distance between the sheets 7 is considerably increased to show more clearly the method of threading the wires. In this construction the sheets are provided with a fired on or printed silver strip 8 in place of an additional wire. Said strip 8 extends to each threaded hole 5 on alternate sides of the strip.

Figure 4:
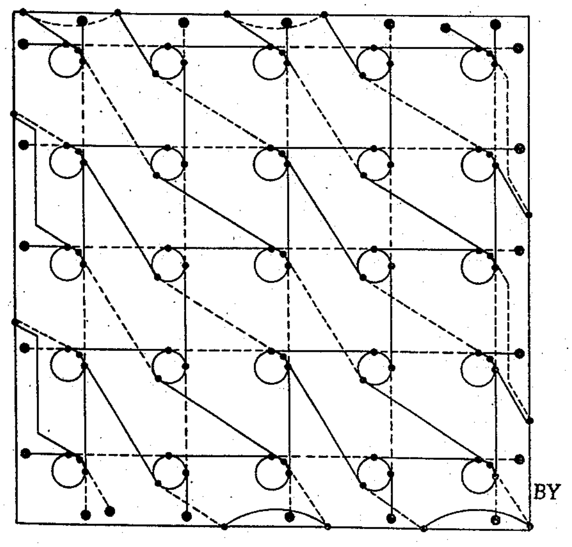

Fig. 4 is a typical example of a printed circuit wiring diagram, wherein the printed silver strip underneath the sheet is shown dotted, the smaller dots indicating where the conductors pass through the hole to the under-side of the sheet.

The symmetrical array of isolation holes surrounding each hole are omitted to simplify the diagram.

As shown in Figs. 2 and 3 the threaded holes 5 are surrounded by an array of holes 4 which are not threaded.

If only one of the sets of wires passing through each hole is applied by a printed circuit arrangement, the threading through is comparatively simple. The whole interior surface of the hole can be metallized as shown at 9 and connected at any two points on opposite surfaces to the conductors 8 running between the holes.

When two or three conductors are printed, the metallizing on the interior surfaces of the holes is preferably divided into segments each of which will be connected, on opposite surfaces, to one of the conducting systems. A suitable tool may be employed to erode the interior of a hole in a suitable way.

As an example of printing, a silk screen method may be used with a palladium paste and a silk screen having any desired pattern to coat the plastic bound film (unfired) and the holes may be painted with palladium and segmented to give the necessary threading. The piece may then be fired to give a sheet of threaded holes requiring connections to be made to points on the edges only.

We claim:

1. In a magnetic memory system, a panel member comprising a sheet of ferromagnetic material, said sheet including at least two clusters of holes, each of said clusters of holes comprising a central hole and an array of equally spaced holes surrounding the central hole, said array of equally spaced holes being closely spaced to each other whereby the central hole serves as the opening in a core defined by the ferromagnetic material between the central hole and the array of holes.

2. A memory system comprising a plurality of the panels as defined in claim 1 including at least one conductor passing through a series of said central holes which are all located on one of said panels and at least one conducting wire passing through a series of central holes which are aligned on a series of said panels.

3. The device as claimed in claim 1 comprising a linear conductive coating extending along a first side of said panel to the edge of a first of said central holes along the interior surface of said first central hole to the opposite side of said panel, thence to a second of said central holes along the interior surface of said second hole and back to the first side of said panel whereby said conductive coating acts the same as a wire threaded through said holes.

References Cited in the file of this patent

UNITED STATES PATENTS

| | | |
|---|---|---|
| 2,688,119 | Gere | Aug. 31, 1954 |
| 2,700,150 | Wales | Jan. 18, 1955 |
| 2,724,103 | Ashenhurst | Nov. 15, 1955 |
| 2,732,542 | Minnick | Jan. 24, 1956 |
| 2,736,880 | Forrester | Feb. 28, 1956 |

Notice of Adverse Decision in Interference

In Interference No. 89,400 involving Patent No. 2,825,046, J. M. Herbert and A. W. Simpson, Production of magnetic material for use in computers or magnetic memory systems, final decision adverse to the patentees was rendered Sept. 18, 1961, as to claim 1.

[*Official Gazette July 23, 1963.*]

Disclaimer 2,825,046.—*John M. Herbert*, Horton, and *Anthony W. Simpson*, Radcliffe-on-Trent, England. PRODUCTION OF MAGNETIC MATERIAL FOR USE IN COMPUTERS OR MAGNETIC MEMORY SYSTEMS. Patent dated Feb. 25, 1958. Disclaimer filed July 1, 1963, by the assignee, *The Plessey Company Limited.*

Hereby enters this disclaimer to claim 1 of said patent.

[*Official Gazette August 20, 1963.*]